(12) United States Patent
Fraser et al.

(10) Patent No.: US 8,702,842 B2
(45) Date of Patent: Apr. 22, 2014

(54) METHOD FOR REMOVING SULFUR FROM A GAS STREAM

(75) Inventors: Kevin S. Fraser, Mississauga (CA); William E. McCombe, Georgetown (CA)

(73) Assignee: Hatch Ltd., Mississauga, Ontario (CA)

( * ) Notice: Subject to any disclaimer, the term of this patent is extended or adjusted under 35 U.S.C. 154(b) by 365 days.

(21) Appl. No.: 13/076,001

(22) Filed: Mar. 30, 2011

(65) Prior Publication Data

US 2011/0174155 A1 Jul. 21, 2011

Related U.S. Application Data

(63) Continuation of application No. PCT/CA2008/001868, filed on Oct. 22, 2008.

(51) Int. Cl.
*B01D 53/14* (2006.01)

(52) U.S. Cl.
USPC ........ 95/36; 95/195; 95/202; 95/205; 95/228; 95/235; 423/242; 423/243.01; 423/578.1

(58) Field of Classification Search
None
See application file for complete search history.

(56) References Cited

U.S. PATENT DOCUMENTS

| | | | | |
|---|---|---|---|---|
| 2,084,697 A | * | 6/1937 | McCluskey | 423/569 |
| 2,984,545 A | * | 5/1961 | Tarbutton et al. | 423/539 |
| 3,658,465 A | | 4/1972 | Drobnick et al. | |
| 3,759,836 A | | 9/1973 | Collins et al. | |
| 3,826,811 A | * | 7/1974 | Hakka | 423/229 |
| 3,838,979 A | | 10/1974 | Sims | |
| 3,911,093 A | * | 10/1975 | Sherif et al. | 423/574.1 |

(Continued)

FOREIGN PATENT DOCUMENTS

| | | |
|---|---|---|
| CA | 2136382 C | 2/2000 |
| WO | WO 2004/024962 A1 | 3/2004 |
| WO | WO 2009/037594 A2 | 3/2009 |

OTHER PUBLICATIONS

Woods, "Extracting Metals From Sulfide Ores", Apr. 2004; revised: Nov. 2004, Electrochemistry Encyclopedia printed from http://electrochem.cwru.edu/ed/encycl/art-m02-metals.htm on Aug. 28, 2008, pp. 1-12.

(Continued)

*Primary Examiner* — Duane Smith
*Assistant Examiner* — Pankti Patel
(74) *Attorney, Agent, or Firm* — K&L Gates LLP (57) ABSTRACT

A method for removing elemental sulfur from a hot gas stream, such as an autoclave vent gas, while simultaneously cooling the gas stream. The method results in conversion of sulfur in the hot gas stream to the form of solid, non-sticky sulfur allotropes such as rhombic sulfur while avoiding formation of sticky sulfur allotropes such as monoclinic sulfur, thereby avoiding scaling and fouling of plant equipment. According the method, the hot gas stream is contacted with an aqueous medium containing a particulate material inside a quench vessel having a first inlet for the hot gas stream, a second inlet for the aqueous medium, and an outlet for removing a sulfur-containing liquid fraction from the vessel. At least a portion of the sulfur contained in the hot gas stream, along with other condensable materials, becomes incorporated into the aqueous medium and is subsequently drained from the vessel. The aqueous medium may comprise a slurry of tailings or other waste material, and the particulate matter contained in the aqueous medium may provide nucleation sites for the preferential formation of non-sticky solid forms of sulfur.

30 Claims, 4 Drawing Sheets

(56) References Cited

U.S. PATENT DOCUMENTS

| | | | |
|---|---|---|---|
| 4,048,287 A * | 9/1977 | Kelleher et al. | 423/243.11 |
| 4,213,924 A | 7/1980 | Shirley, Jr. | |
| 4,353,852 A | 10/1982 | Tse | |
| 4,834,955 A | 5/1989 | Mouché et al. | |
| 4,931,264 A * | 6/1990 | Rochelle et al. | 423/244.01 |
| 4,935,221 A * | 6/1990 | Bronfenbrenner et al. | 423/574.1 |
| 5,071,477 A | 12/1991 | Thomas et al. | |
| 5,264,193 A | 11/1993 | Corcoran, Jr. et al. | |
| 5,340,383 A * | 8/1994 | Womack | 95/243 |
| 5,489,326 A | 2/1996 | Thomas et al. | |
| 6,945,775 B2 | 9/2005 | Fraser et al. | |
| 2007/0034344 A1 * | 2/2007 | Reilama et al. | 162/51 |
| 2009/0071296 A1 | 3/2009 | Hillier et al. | |
| 2009/0074607 A1 | 3/2009 | Hillier et al. | |
| 2010/0275781 A1 * | 11/2010 | Tsangaris et al. | 96/108 |
| 2011/0262345 A1 * | 10/2011 | Petrinec et al. | 423/571 |
| 2012/0148465 A1 * | 6/2012 | Huang et al. | 423/224 |

OTHER PUBLICATIONS

Office Action mailed Dec. 3, 2012 in corresponding Great Britain Patent Application No. GB1105292.5.

* cited by examiner

METHOD FOR REMOVING SULFUR FROM A GAS STREAM

CROSS-REFERENCE TO RELATED APPLICATION

This application is a continuation of International Application No. PCT/CA2008/001868, filed on Oct. 11, 2008, now pending.

FIELD OF THE INVENTION

The invention relates to the separation of elemental sulfur from a hot gas stream.

BACKGROUND OF THE INVENTION

A number of industrial processes produce vent gases or off-gases containing elemental sulfur. One example of such a process is the pressure oxidation of metal-bearing sulfide minerals. Pressure oxidation involves contacting a mineral slurry with an oxidant, such as oxygen gas, at elevated temperature and pressure in an autoclave to oxidize one or more of the minerals, thereby freeing metal values of interest for possible recovery in subsequent metal recovery operations. Where the mineral undergoing pressure oxidation is a sulfide ore, the sulfide sulfur of the ore is oxidized to one or more sulfur species, such as sulfate and/or elemental sulfur, depending on the process conditions and the specific ore being oxidized.

At the elevated temperatures and pressures of the oxidation reaction, elemental sulfur can exist in liquid or vapor form and is discharged from the autoclave as a component of the autoclave vent gas. After leaving the autoclave, the vent gas is typically passed through a gas scrubber and discharged to atmosphere. In more recently designed pressure oxidation plants, the vent gas is passed through an aqueous medium, typically water, inside a quench vessel to recover heat from the vent gas and to remove condensable materials, thereby reducing the volume of vent gas which must be treated by the gas scrubber. The elemental sulfur in the vent gas solidifies during quenching and is removed from the quench vessel with the aqueous medium containing the condensed fraction of the vent gas. The aqueous medium is drained from the quench vessel and may be subjected to further process steps such as neutralization, solids removal and/or heat recovery.

Elemental sulfur is known to exist in several different solid forms, known as allotropes. The predominant sulfur allotrope produced during rapid quenching of sulfur liquid or vapor is monoclinic sulfur, which tends to form a soft, sticky, amorphous mass and causes difficulties during subsequent processing of the aqueous medium drained from the quench vessel. In particular, monoclinic sulfur blinds filters used for recovery of solids and contributes to the scaling of process equipment such as heat exchangers which may be used to recover heat from the condensed vent gas.

Thus, there is a need for a sulfur removal process which avoids the formation of sticky allotropes of sulfur.

SUMMARY OF THE INVENTION

In one aspect, the present invention provides a method for removing elemental sulfur from a hot gas stream. The method comprises the following steps: (a) providing an aqueous medium containing a particulate material; (b) providing a vessel having a first inlet for the hot gas stream, a second inlet for the aqueous medium, and an outlet for removing a sulfur-containing liquid fraction from the vessel; (c) passing the hot gas stream into the vessel through the first inlet; (d) passing the aqueous medium into the vessel through the second inlet, such that the hot gas stream and the aqueous medium come into contact with one another inside the vessel to form the sulfur-containing liquid fraction; and (e) draining the sulfur-containing liquid fraction from the vessel through the outlet.

In an embodiment of the invention, the vessel further comprises a gas vent through which a non-condensable gas fraction of the hot gas stream is removed from the vessel, wherein the non-condensable gas fraction is passed to a gas scrubber or other gas cleaning equipment. The gas vent may be located in an upper end of the vessel.

In an embodiment of the invention, the vessel has a condensing section in which the aqueous medium contacts the hot gas stream and a collection section located downstream of the condensing section and adjacent to said outlet, wherein the sulfur-containing liquid fraction is collected in the collection section. The first inlet for the hot gas stream may be located at a lower end of the condensing section, such that the gas stream moves upwardly through the condensing section, and the second inlet for the aqueous medium may be located at an upper end of the condensing section such that the aqueous medium moves downwardly through the condensing section. The condensing section of the vessel may be provided with a plurality of baffles which create tortuous flow paths for the hot gas stream and the aqueous medium. Alternatively, the condensing section may contain a spray tree from which the aqueous medium is sprayed toward the walls of the vessel, and the hot gas stream follows a helical flow path through the condensing section.

In an embodiment of the invention, the aqueous medium entering the vessel is at a lower temperature than the hot gas stream entering the vessel, and may be at ambient temperature. The hot gas stream entering the vessel may be at a temperature of from about 110 to about 240 degrees C. and may have a sulfur content of from about 0.001 to about 1.0 weight percent, wherein the sulfur in the hot gas stream may be in gaseous or liquid form. The sulfur may then be converted to a solid form when it comes into contact with the aqueous medium, with the solid sulfur predominantly comprising rhombic sulfur.

In an embodiment of the invention, the hot gas stream may be an autoclave vent gas which also contains steam, wherein at least a portion of the steam is condensed in the condensing section of the vessel and forms part of the sulfur-containing liquid fraction which is drained from the vessel.

In an embodiment of the invention, the method further comprises the step of removing solids from the sulfur-containing liquid fraction downstream of the vessel so as to form a second liquid fraction, wherein the solids removed from the liquid fraction include the particulate material of the aqueous medium and solidified sulfur from the hot gas stream. The method may further comprise the step of recovering heat from the second liquid fraction by passing the second liquid fraction through a heat exchanger.

In an embodiment of the invention, the solids removal step may comprise substantially complete removal of the solids from the liquid fraction. Alternatively, the solids removal step may comprise removal of a selected portion of the solids from the liquid fraction such that at least a portion of the particulate material from the aqueous medium remains in the second liquid fraction. The selected portion of the solids may be removed from the liquid fraction on a continuous basis and may, for example, include fine particulates, with a coarser fraction of the solids remaining in the second liquid fraction.

In an embodiment of the invention, at least a portion of the second liquid fraction may be recycled to the condensing section of the vessel, such that the second liquid fraction forms at least a portion of the aqueous medium entering the vessel through the second inlet.

In an embodiment of the invention, the solids removal step may be performed by a solids removal apparatus, and the method may further comprise bypassing a portion of the liquid fraction around the solids removal apparatus on either a continuous or periodic basis so as to maintain a desired content of solids in the second liquid fraction.

In an embodiment of the invention, the aqueous medium comprises an aqueous slurry derived from the process stream in which said method is performed and may, for example, comprise a tailings slurry. Alternatively, the aqueous medium may comprise an aqueous slurry which is dedicated to said method and wherein the particulate material is an inert material, for example a silicate material.

In an embodiment of the invention, the aqueous medium may have a solids content of from above 0% to about 65% solids by weight. The aqueous medium may contain particles having a particle size from about 1 micron to about 5 mm, which may have a particle size distribution (P80) from about 10-150 microns.

BRIEF DESCRIPTION OF THE DRAWINGS

The invention will now be described by way of example only, with reference to the accompanying drawings, in which.

DETAILED DESCRIPTION

Several embodiments of the invention are now described below with reference to the flow diagrams of FIGS. 1 and 4. All the embodiments described herein specifically relate to the separation of elemental sulfur from the vent gas stream of an autoclave in which one or more sulfidic minerals are oxidized to generate a number of reaction products, including elemental sulfur as a reaction by-product. Unless otherwise indicated, the terms "sulfur" and "elemental sulfur" as used herein refer to sulfur in its zero oxidation state. Although the sulfur removal process according to the invention is described herein in the context of a pressure oxidation process, it is not restricted thereto. The process according to the invention can be used to separate sulfur from any hot, sulfur-containing gas stream.

Figure 1:
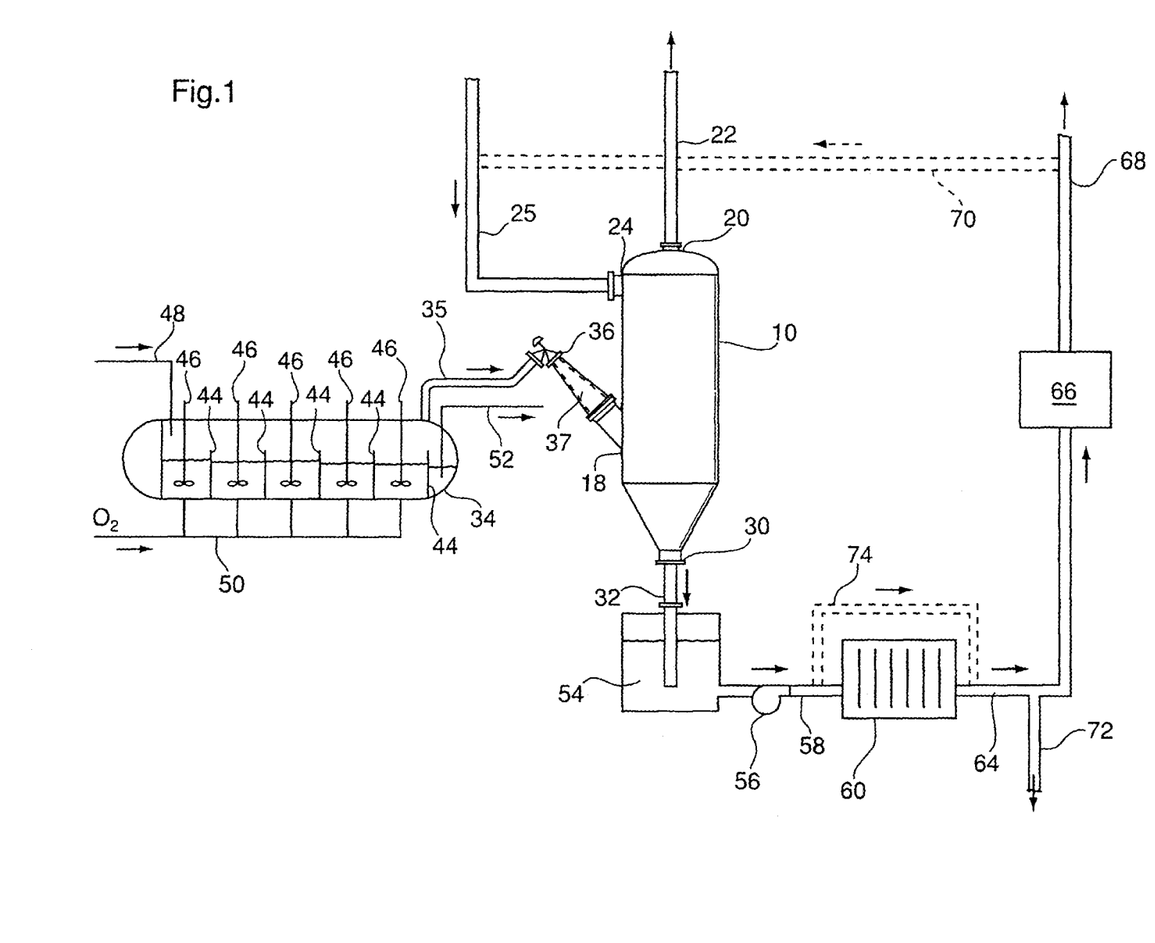
FIG. 1 is a flow diagram illustrating process steps in the method according to the invention.

FIG. 1 illustrates an autoclave 34 in which an aqueous slurry of a sulfide mineral-bearing material is oxidized by oxygen gas under elevated temperature and pressure. The specific identity of the sulfide mineral-bearing material undergoing pressure oxidation is not particularly important to the present invention, except insofar that one of the products of the oxidation is elemental sulfur. The sulfide mineral-bearing material may comprise one or more sulfide ores, including ores of base metals such as copper, nickel, cobalt and zinc, or precious metals such as silver and gold.

The autoclave 34 shown in FIG. 1 has a typical structure, comprising a number of compartments separated by dividers 44. The aqueous slurry continuously enters the autoclave 34 through inlet conduit 48 and successively overflows each divider 44 as it moves through the autoclave 34. Each compartment is provided with an agitator 46 to stir the slurry and an oxygen inlet through which oxygen is fed to each compartment from oxygen conduit 50. Although not shown, other reagents such as sulfuric acid may be added to the autoclave 34 in order to assist in the oxidation, and steam and/or liquid water may be added to one or more of the compartments to regulate the temperature of the slurry. The oxidized slurry is continuously discharged from the last compartment of the autoclave 34 through outlet conduit 52. The oxidized slurry is then subjected to further processing steps, not described herein, in order to recover one or more metal values contained therein.

The interior of autoclave 34 is at an elevated temperature, typically within the range from about 110° C. to about 240° C., and an elevated pressure which may be as high as about 40 bar (about 600 psi). The pressure inside the autoclave 34 is regulated by venting the autoclave gases on a continuous or intermittent basis through gas vent valve 36 which receives the vent gas from gas conduit 35 which communicates with the interior of the autoclave 34. The vent gas is at the above-mentioned autoclave temperature and pressure when it enters the gas vent valve 36.

The vent gas consists primarily of steam, non-condensable gases such as oxygen and nitrogen, and also contains elemental sulfur in vapor or liquid form. The sulfur content of the vent gas may be greater than about 0.001 weight percent, and is typically within the range from about 0.001 to 1.0 weight percent. A typical composition of the vent gas exiting autoclave 34 is as follows:

Steam—about 40-95% v/v;
Nitrogen—about 0-3% v/v;
Oxygen—about 1-30% v/v;
Carbon Dioxide—about 0-25% v/v; and
Sulfur—about 0.001-1.0% w/w.

The vent gas pressure is reduced from the above-mentioned autoclave pressure to between 0.10 and 0.15 bar (g) as it flows through gas vent valve 36 and expands through a conical diffuser 37 toward a quench vessel 10. Inside quench vessel 10 the vent gas is rapidly desuperheated to less than 100° C. The rapid cooling of the vent gas brings about condensation of steam component of the vent gas as well as solidification of the elemental sulfur component.

Figure 2:
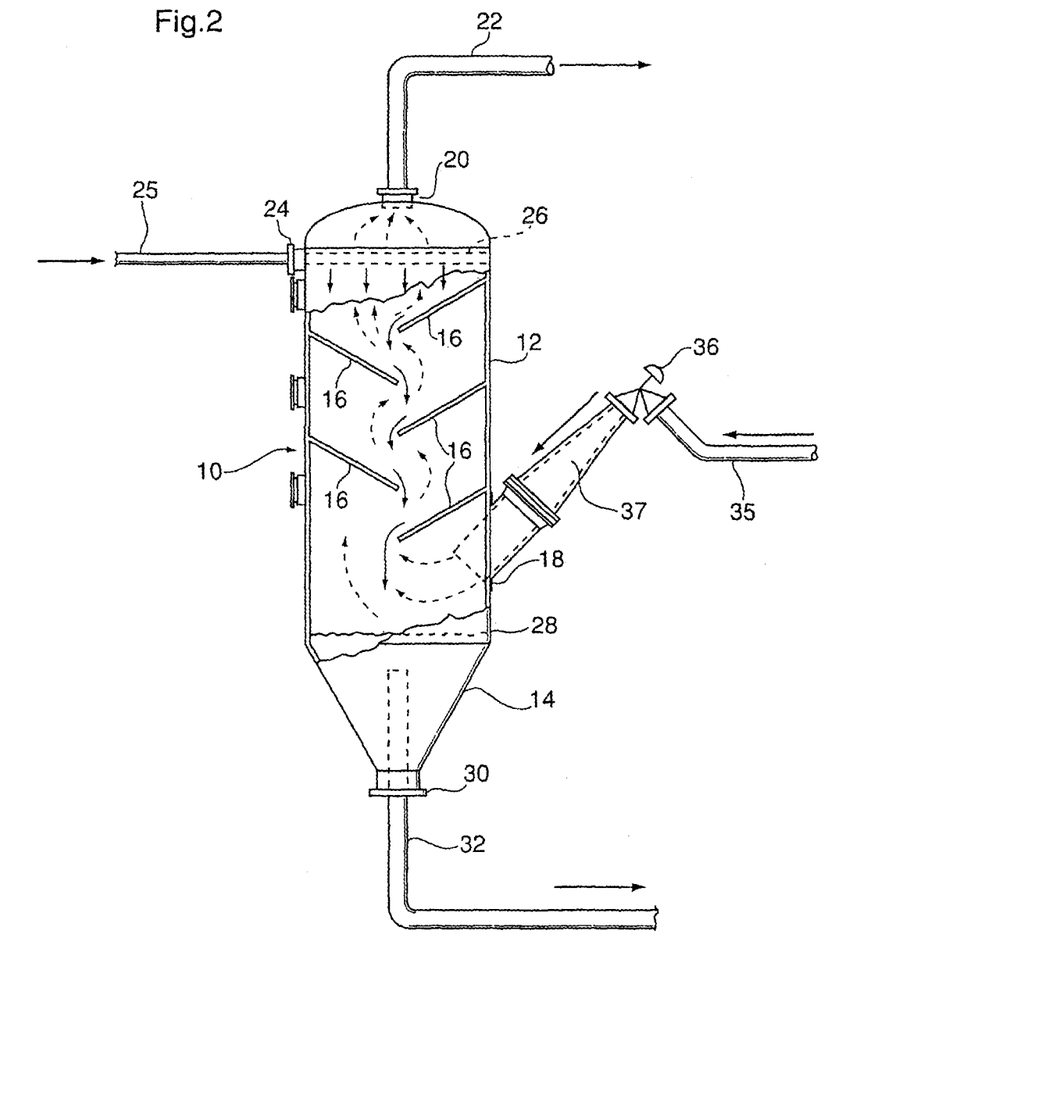
FIG. 2 is a schematic view of a quench vessel shown in the flow diagram of FIG. 1.

The quench vessel 10 and the quenching step are now described in more detail with reference to FIG. 2, which provides a more detailed view of the quench vessel 10 shown in FIG. 1. The construction of quench vessel 10 is similar to that of the heater vessel shown in commonly assigned U.S. Pat. No. 6,945,775 to Fraser et al. which issued on Sep. 20, 2005, and which is incorporated herein by reference in its entirety.

The quench vessel 10 comprises a condensing section 12 and a collection section 14 which is located downstream of the condensing section 12. In the embodiment of FIG. 2, the condensing section 12 and collection section 14 are arranged vertically relative to one another with the condensing section 12 being located in an upper portion of vessel 10 and the collection section 14 being located in a lower portion of the vessel 10.

The condensing section 12 may include a plurality of baffles 16 projecting inwardly from the walls of quench vessel 10, and angled downwardly toward the collection section 14. A first inlet 18 for receiving the superheated vent gas from diffuser 37 is located below the lowermost baffle 16 and above the collection section 14. A second inlet 24 for receiving an aqueous cooling medium is located at or near the top of the condensing section 12.

The aqueous medium enters the quench vessel 10 through second inlet 24 and is distributed through a perforated pipe 26 across the uppermost baffle 16 into the interior of the quench vessel 10. The aqueous medium is at a lower temperature than the hot gas stream as it enters the quench vessel 10 and may, for example, be at ambient temperature and a supply pressure as low as 1 bar(g). The aqueous medium is carried downwardly through the condensing section 12 by gravity, passing down across the surfaces of the baffles 16 in the direction of the solid arrows shown inside the vessel 10, and is collected in the collection section 14.

The diffuser 37 and first inlet 18 are angled downwardly to direct the superheated gas stream downwardly toward the aqueous medium in collection section 14, thereby reducing the velocity and temperature of the vent gas. The vent gas then flows upwardly through the condensing section 12 in the direction of the dashed arrows shown inside the vessel 10, following a tortuous path as it flows around the baffles 16, and contacting the downwardly flowing aqueous cooling medium.

The cooling of the hot vent gas stream results in condensation of steam and solidification of sulfur, both of which become incorporated in the aqueous medium collected in the collection section 14. The aqueous medium also becomes heated by contact with the hot gas stream, typically to within a range of about 25-100 degrees C. The non-condensable fraction of the vent gas stream continues its upward flow through the condensing section 12, exiting the vessel 10 through a vent gas outlet 20 which is located in the upper end of vessel 10, and entering a vent gas conduit 22 which may be connected to a scrubber or other gas cleaning equipment (not shown). A typical composition of the vent gas exiting quench vessel 10 through outlet 20 is as follows:

Steam—about 30-70% v/v;
Nitrogen—about 0-5% v/v;
Oxygen—about 5-50% v/v;
Carbon Dioxide—about 0-30% v/v; and
Sulfur—about 0.001-0.5% w/w.

The liquid fraction collected in collection section 14 (also referred to herein as the "sulfur-containing liquid fraction") therefore includes the aqueous medium, condensable components of the hot vent gas stream including condensed steam, and solidified sulfur from the hot vent gas stream. The approximate level of the collected liquid fraction inside section 14 is designated by reference numeral 28. An outlet 30 for draining the liquid fraction is provided adjacent to the collection section 14, and is preferably provided at the lower end thereof. The liquid fraction is discharged from outlet 30 and enters a conduit 32 through which is carried away from the quench vessel 10 for further processing, as described in detail below. The concentration of sulfur in the liquid fraction discharged from outlet 30 is of course highly variable as it depends on the amount of quenching medium added to vessel 10 relative to the sulfur content of the vent gas stream, which is itself highly variable. Typically, the sulfur content of the sulfur-containing liquid fraction may be in the range from about 5 ppm to 1% by weight.

Figure 3:
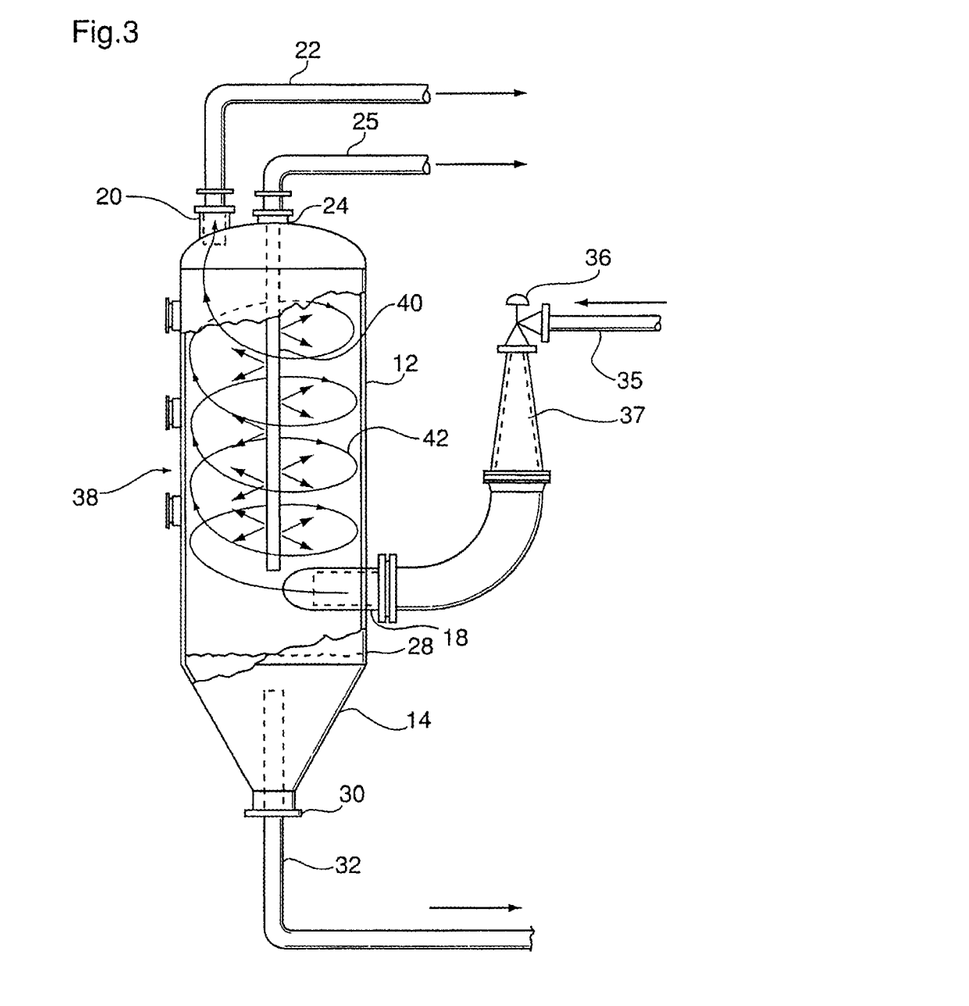
FIG. 3 is a schematic view of a quench vessel for use in a method according to a second embodiment of the invention.
Figure 4:
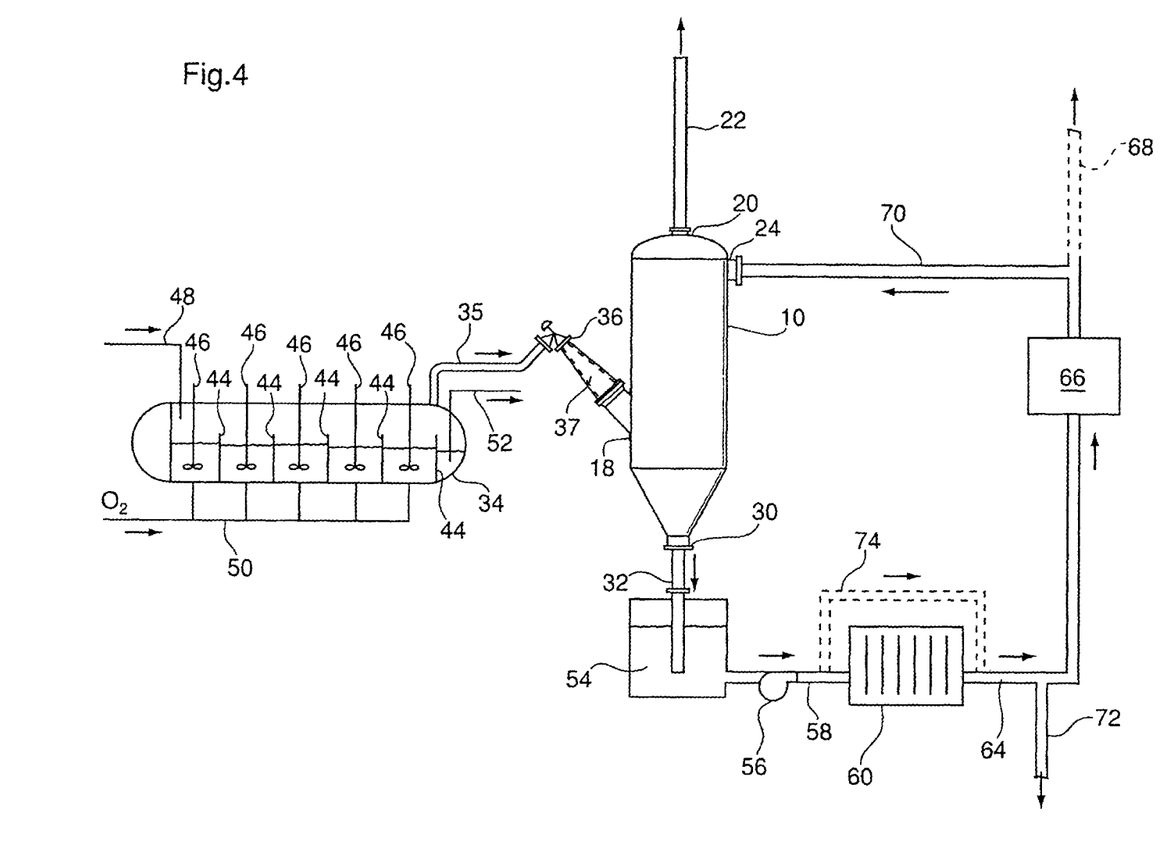
FIG. 4 is a flow diagram illustrating process steps according to an embodiment of the invention.

FIG. 3 schematically illustrates a second type of quench vessel 38 which may be used in the method according to the invention, and which may be substituted for quench vessel 10 in the flow diagrams of FIGS. 1 and 4. Quench vessel 38 is similar to vessel 10 described above, and like components of vessel 38 are identified by like reference numerals. Quench vessel 38 differs from vessel 10 in that it does not include baffles 16, but rather utilizes a spray tree design in order to provide contact between the aqueous medium and the hot gas stream. In particular, the spray tree comprises a perforated pipe 40 which extends vertically through the center of vessel 38, and which is connected to the inlet 24. The aqueous medium is sprayed outwardly from nozzles on pipe 40 toward the walls of vessel 38. The hot gas stream enters the vessel 38 in the lower end of the condensing section 12 and follows a helical path as it moves upwardly through the condensing section 12 from the inlet 18, as indicated by helical arrow 42, thus providing contact between the aqueous medium and the hot gas stream. The helical flow path 42 may be created by locating the first inlet 18 so that the hot gas stream enters the vessel 38 tangentially relative to the cylindrical wall of the vessel 38.

As mentioned above, the quenching of a sulfur-containing vent gas brings about a rapid phase transformation of gaseous or liquid elemental sulfur to the solid phase, resulting in the formation of amorphous, "sticky" sulfur allotropes such as monoclinic sulfur. Although further cooling of monoclinic sulfur will eventually cause it to be at least partially converted to more stable, non-sticky allotropes such as rhombic sulfur, even the temporary presence of monoclinic sulfur in the aqueous medium is undesirable as it causes difficulties in further processing steps which may be conducted downstream of the quench vessel 10.

In the process according to the present invention the formation of sticky sulfur allotropes during quenching is substantially reduced or eliminated. In particular, the inventors have found that the incorporation of a particulate material into the aqueous cooling medium promotes the conversion of the gaseous or liquid sulfur in the vent gas directly to stable, crystalline, non-sticky sulfur allotropes such as rhombic sulfur, with little or no formation of sticky sulfur allotropes such as monoclinic sulfur. While not wishing to be bound by any theory, the inventors believe that the particulate material in the aqueous medium provides nucleation sites for the preferential formation of stable, non-sticky sulfur allotropes such as rhombic sulfur. The specific nature and amount of the particulate material contained in the aqueous medium are highly variable since the particulate material does not react with sulfur to bring about any chemical change. The specific compositions of the aqueous medium and the particulate material are therefore highly variable and are at least partially dependent on the overall process stream into which the method of the invention is incorporated. Specific examples of particulate-containing aqueous media for use in the present invention are described below.

The following is a discussion of the processing steps which the sulfur-containing liquid fraction may undergo after it is drained from the quench vessel 10 or 38.

According to some embodiments of the invention, the sulfur-containing liquid fraction may be settled or filtered so as to provide a complete or partial separation between the liquid and solid components contained therein. This separation may be performed so as to permit recycling or recovery of the liquid or solid components of the liquid fraction. Also, because the aqueous medium is heated by the hot gas stream as it passes through quench vessel 10, it may be at an elevated temperature when it leaves the vessel 10. Therefore, it may also be desired to recover heat from the sulfur-containing liquid fraction, for example by passing the liquid fraction through a heat exchanger. The further processing steps described below include both a solids separation step and a heat recovery step.

In the flow diagram of FIG. 1, the particulate-containing aqueous medium is fed to second inlet 24 of quench vessel 10 through conduit 25, and absorbs sulfur from the vent gas stream entering vessel 10 through inlet 18. The resulting sulfur-containing liquid fraction, in which the sulfur is present in the form of one or more non-sticky sulfur allotropes such as rhombic sulfur, is drained from vessel 10 through outlet 30 and enters conduit 32. The sulfur-containing liquid fraction may first be passed to an intermediate storage tank 54 before undergoing further processing. From storage tank 54, the sulfur-containing liquid fraction is pumped by a pump 56 through a conduit 58 to a solids removal device 60 which may comprise a filter, thickener, or other separation device for removing some or all of the solids from the sulfur-containing liquid fraction. The solids removed from the liquid fraction may comprise some or all of the particulate material originally contained in the aqueous medium, as well as some or all of the solidified sulfur contained in the aqueous medium. The inventors have found that the method according to the invention provides improved separation of solid sulfur from the aqueous medium, as compared to similar processes in which the aqueous medium does not contain particulate matter, due to the fact that the non-sticky allotropes of sulfur contained in the aqueous medium are easier to remove by filtration than sticky allotropes such as monoclinic sulfur.

The liquid fraction exiting the solids removal device 60 through conduit 64 has a lower level of solids than the sulfur-containing liquid fraction exiting the quench vessel 10. This liquid is sometimes referred to herein as the "second liquid fraction". Since the second liquid fraction may be at an elevated temperature, it may be desired to recover heat from it by passing it through a heat exchanger 66, which may comprise a shell-and-tube heat exchanger. The heat exchanger 66 may preferably be located downstream of the solids removal device 60, although it will be appreciated that this is not always the case. In some embodiments of the invention the solids removal device 60 is located downstream of the heat exchanger 66, and some other embodiments of the invention may not include a solids removal step at all. The inventors have found that scaling of the interior surfaces of the heat exchanger is either reduced or eliminated in the method of the present invention, regardless of whether the heat exchange step is preceded by a solids removal step. It is believed that the reduction or elimination of scaling is due to the preferential conversion of sulfur in the vent gas to a crystalline, non-sticky allotrope such as rhombic sulfur, partly because non-sticky sulfur allotropes are more easily removed during the solids removal step, and also because non-sticky sulfur allotropes contribute less to scaling than do sticky sulfur allotropes. In this regard, the inventors have found that sticky forms of sulfur, such as monoclinic sulfur, not only adhere to the process equipment but also cause other particles to become adhered to surfaces of the process equipment, resulting in the formation of scale. Although the invention is described above as having a beneficial reduction in scaling of a heat exchanger, it will be appreciated that scaling caused by sticky sulfur allotropes is undesirable at any point in the process stream, and that the present invention can potentially produce positive benefits at any point where sticky sulfur allotropes contribute to the scaling of process equipment.

In some embodiments of the invention, none of the second liquid fraction is recycled back to the quench vessel 10. In these embodiments, the entire volume of the second liquid fraction is sent through conduit 68, either for disposal or for use at another point in the process stream, and the recycling conduit 70, shown in dotted lines in FIG. 1, is unnecessary. The aqueous medium entering quench vessel 10 may be entirely made up of slurry from another point in the process stream, and may comprise virtually any particulate-containing process waste stream, with the possible exception of those which contain undesirable components which could be volatilized by contact with the vent gas stream, or where the waste stream will be processed further and the presence of sulfur in the slurry will interfere with the further processing. For example, the aqueous medium may comprise any tailings slurry, comprising a waste slurry from any point in the process which is destined for disposal. In some embodiments of the invention, the tailings slurry may contain spent mineral particles which have undergone pressure oxidation and subsequent metal recovery steps, and which is destined for disposal, for example in a tailings pond. Alternatively, where no existing process slurry is available or suitable for use, a dedicated slurry may be used in the method of the invention. The dedicated slurry may preferably be made up by water and an inert particulate material, such as silica (sand). The particle content of the aqueous medium is highly variable, ranging from above 0% to about 65% solids by weight. The sizes of the particles in the aqueous medium is also highly variable, and may range from less than about 1 micron to about 5 mm, with a particle size distribution (P80) from about 10-150 microns.

In other embodiments of the invention, at least a portion of the cooled second liquid fraction may be recycled back to the quench vessel 10 through recycling conduit 70. Several process variations involving the partial or complete recycling of the second liquid fraction are now described below with reference to FIGS. 1 and 4.

Firstly, when recycling a portion of the second liquid fraction, it is important to maintain a proper water balance in the system. Since steam is present in the autoclave vent gas, and subsequently is condensed in the quench vessel, a corresponding amount of water must be removed downstream of the quench vessel in order to maintain the water balance. As shown in FIG. 1, water may be removed from the process stream downstream of the solids removal device 60, either upstream of heat exchanger through conduit 72, or downstream of heat exchanger 66 through conduit 68.

In some embodiments of the invention, it is desired that the aqueous medium entering the quench vessel is partially made up of a process slurry, which may comprise a tailings slurry as described above, and partially made up of the second liquid fraction. In this case, a portion of the second liquid fraction is recycled back to quench vessel 10 through conduit 70 and may be combined with the process slurry entering the quench vessel 10 through inlet 24. This embodiment is also illustrated in FIG. 1, which shows the recycling conduit 70 being connected to the conduit 25, in order to combine the process slurry and the second liquid fraction upstream of the quench vessel 10. It will be appreciated that a valve (not shown) may be provided at the connection points between conduits 25 and 70 in order to regulate the relative amounts of process slurry and recycled second liquid fraction entering the quench vessel. It will also be appreciated that the recycling conduit 70 may lead directly to the quench vessel 10 such that the process slurry and the recycled second liquid fraction are mixed inside the quench vessel 10.

It may also be desired in this embodiment to control the particle content of the second liquid fraction which is recycled back to the quench vessel 10. In one variant of the method, the recycled portion of the second liquid fraction may be free of particles, in which case the solids removal device 60 removes all or substantially all of the particulate matter from the second liquid fraction. In other variants the second liquid fraction may contain particulate matter, in which case all or a portion of the second liquid fraction bypasses the solids removal device 60, for example through bypass circuit 74, or device 60 may be configured to remove only a certain fraction of the particulate matter from the second liquid fraction. Partial removal of solids from the slurry involves yet other process variations which are described in greater detail below.

In yet another embodiment of the invention, the aqueous medium entering quench vessel 10 may be entirely made up of the second liquid fraction. In this embodiment, which is illustrated in FIG. 4, the entire volume of the aqueous medium is supplied to quench vessel 10 through recycling conduit 70, and conduit 25 is therefore eliminated. In this embodiment, the second liquid fraction preferably undergoes only partial removal of solids so as to maintain a proper solids balance in the aqueous medium entering quench vessel 10, in order to ensure that the aqueous medium contains sufficient nucleation sites for sulfur solidification. This can be accomplished in several ways. In one variant of this embodiment, the solids removal device selectively removes a certain size fraction of solids from the liquid fraction exiting the quench vessel 10. For example, the solids removal device 60 may selectively remove fine particulates from the liquid fraction, while permitting relatively coarse particles to remain in the second liquid fraction and be recycled back to the quench vessel 10 through conduit 70. The inventors have found that coarse particles may provide better nucleation sites and are easier to remove by filtration than fine particles, and therefore fine particles are preferentially removed.

In another variant of this embodiment, the solids removal device 60 may remove substantially all solids from the liquid fraction. However, a bypass circuit 74 (shown in dotted lines in FIGS. 1 and 4) is provided so as to permit a portion of the sulfur-containing liquid fraction to bypass the solids removal device, either on a continuous or intermittent basis, and thereby maintain a desired concentration of solids in the liquid fraction. This variant may be used where selective removal of certain particle sizes is unnecessary. Moreover, this embodiment demonstrates that the circuit may be operated in a non-steady state manner, whereby solids removal occurs, the bypass is initiated and solids build up in the circuit to a critical amount, at which time filtration is conducted again.

It is also important in the embodiment of FIG. 4 to maintain a proper water balance, and therefore a portion of the liquid fraction is removed either upstream 72 or downstream 68 of the heat exchanger 66, as described above.

The embodiment of FIG. 4 may be particularly useful in retrofit applications where all available feed slurries are already used at other locations in the process.

Although the present invention has been described with reference to certain preferred embodiments, it will be appreciated that the invention is not limited thereto. Rather, the invention includes all embodiments which may fall within the scope of the following claims.

What is claimed is:

1. A method for removing elemental sulfur from a hot gas stream comprising elemental sulfur, comprising:
   (a) providing an aqueous medium containing a particulate material;
   (b) providing a vessel having a first inlet for the hot gas stream, a second inlet for the aqueous medium, and an outlet for removing a sulfur-containing liquid fraction from the vessel;
   (c) passing the hot gas stream into the vessel through said first inlet;
   (d) passing the aqueous medium into the vessel through said second inlet, such that the hot gas stream and the aqueous medium come into contact with one another inside said vessel to form said sulfur-containing liquid fraction; and
   (e) draining said sulfur-containing liquid fraction from the vessel through said outlet.

2. The method of claim 1, wherein the vessel further comprises a gas vent through which a non-condensable gas fraction of said hot gas stream is removed from the vessel, wherein the non-condensable gas fraction is passed to a gas scrubber or other gas cleaning equipment.

3. The method of claim 2, wherein the gas vent is located in an upper end of the vessel.

4. The method of claim 1, wherein the vessel has a condensing section in which the aqueous medium contacts the hot gas stream and a collection section located downstream of the condensing section and adjacent to said outlet, wherein the sulfur-containing liquid fraction is collected in said collection section.

5. The method of claim 4, wherein the first inlet for the hot gas stream is located at a lower end of the condensing section, such that the gas stream moves upwardly through the condensing section, and the second inlet for the aqueous medium is located at an upper end of the condensing section such that the aqueous medium moves downwardly through the condensing section.

6. The method of claim 5, wherein the condensing section of the vessel is provided with a plurality of baffles which create tortuous flow paths for the hot gas stream and the aqueous medium.

7. The method of claim 5, wherein the condensing section contains a spray tree from which the aqueous medium is sprayed toward the walls of the vessel, and the hot gas stream follows a helical flow path through the condensing section.

8. The method of claim 1, wherein the aqueous medium entering the vessel is at a lower temperature than the hot gas stream entering the vessel.

9. The method of claim 8, wherein the aqueous medium entering the vessel is at ambient temperature.

10. The method of claim 8, wherein the hot gas stream entering the vessel is at a temperature of from about 110 to about 240 degrees C., and wherein the sulfur in the hot gas stream is in gaseous or liquid form.

11. The method of claim 1, wherein the sulfur content of the hot gas stream is from about 0.001 to about 1.0 weight percent.

12. The method of claim 1, wherein the sulfur in the hot gas stream is converted to solid form when it comes into contact with the aqueous medium.

13. The method of claim 12, wherein said solid form of sulfur predominantly comprises rhombic sulfur.

14. A method for removing elemental sulfur from a hot gas stream comprising elemental sulfur, the method comprising:
   (a) providing an aqueous medium containing a particulate material;
   (b) providing a vessel having a first inlet for said hot gas stream, a second inlet for said aqueous medium, and an outlet for removing a sulfur-containing liquid fraction from the vessel;
   (c) passing said hot gas stream into the vessel through the first inlet;
   (d) passing said aqueous medium into the vessel through the second inlet, such that said hot gas stream and said the aqueous medium come into contact with one another inside the vessel to form said sulfur-containing liquid fraction; and
   (e) draining said sulfur-containing liquid fraction from the vessel through the outlet;

wherein the vessel comprises a condensing section in which said aqueous medium contacts the said gas stream, and a collection section located downstream of the condensing section and adjacent to the outlet, wherein said sulfur-containing liquid fraction is collected in the collection section; and wherein said hot gas stream is an autoclave vent gas which also contains steam, wherein at least a portion of the steam is condensed in the condensing section and forms part of said sulfur-containing liquid fraction which is drained from the vessel.

15. The method of claim 14, further comprising removing solids from said sulfur-containing liquid fraction downstream of the vessel so as to form a second liquid fraction, wherein said solids include the particulate material of the aqueous medium and solidified sulfur from said hot gas stream.

16. The method of claim 15, further comprising recovering heat from said second liquid fraction by passing said second liquid fraction through a heat exchanger.

17. The method of claim 15, wherein removing solids from said sulfur-containing liquid fraction comprises substantially complete removal of said solids from said liquid fraction.

18. The method of claim 15, wherein removing solids from said sulfur-containing liquid fraction comprises removal of a selected portion of said solids from said liquid fraction such that at least a portion of said particulate material from the aqueous medium remains in the second liquid fraction.

19. The method of claim 18, wherein at least a portion of the second liquid fraction is recycled to the condensing section of the vessel.

20. The method of claim 19, wherein the second liquid fraction forms at least a portion of said aqueous medium entering the vessel through the second inlet.

21. The method of claim 18, wherein said selected portion of said solids is removed from said liquid fraction on a continuous basis.

22. The method of claim 18, wherein removing solids from said sulfur-containing liquid fraction is performed by a solids removal apparatus, and wherein said method further comprises bypassing a portion of said liquid fraction around said solids removal apparatus on either a continuous or periodic basis so as to maintain a desired content of solids in said second liquid fraction.

23. The method of claim 18, wherein said selected portion of said solids includes fine particulates, whereas a coarser fraction of the solids remains in the second liquid fraction.

24. The method of claim 1, wherein the aqueous medium comprises an aqueous slurry derived from the process stream in which said method is performed.

25. The method of claim 24, wherein the aqueous medium comprises a tailings slurry.

26. The method of claim 1, wherein the aqueous medium comprises an aqueous slurry which is dedicated to said method and wherein the particulate material is an inert material.

27. A method for removing elemental sulfur from a hot gas stream comprising elemental sulfur, the method comprising:
(a) providing an aqueous medium containing a particulate material;
(b) providing a vessel having a first inlet for said hot gas stream, a second inlet for said aqueous medium, and an outlet for removing a sulfur-containing liquid fraction from the vessel;
(c) passing said hot gas stream into the vessel through the first inlet;
(d) passing said aqueous medium into the vessel through the second inlet, such that said hot gas stream and said aqueous medium come into contact with one another inside the vessel to form said sulfur-containing liquid fraction; and
(e) draining said sulfur-containing liquid fraction from the vessel through the outlet;
wherein said aqueous medium comprises an aqueous slurry which is dedicated to said method, and wherein said particulate material is an inert silicate material.

28. The method of claim 1, wherein the aqueous medium has a solids content of from above 0% to about 65% solids by weight.

29. A method for removing elemental sulfur from a hot gas stream comprising elemental sulfur, the method comprising:
(a) providing an aqueous medium containing a particulate material;
(b) providing a vessel having a first inlet for said hot gas stream, a second inlet for said aqueous medium, and an outlet for removing a sulfur-containing liquid fraction from the vessel;
(c) passing said hot gas stream into the vessel through the first inlet;
(d) passing said aqueous medium into the vessel through the second inlet, such that said hot gas stream and said aqueous medium come into contact with one another inside the vessel to form said sulfur-containing liquid fraction; and
(e) draining said sulfur-containing liquid fraction from the vessel through the outlet;
wherein the aqueous medium contains particles having a particle size from about 1 micron to about 5 mm.

30. A method for removing elemental sulfur from a hot gas stream comprising elemental sulfur, the method comprising:
(a) providing an aqueous medium containing a particulate material;
(b) providing a vessel having a first inlet for said hot gas stream, a second inlet for said aqueous medium, and an outlet for removing a sulfur-containing liquid fraction from the vessel;
(c) passing said hot gas stream into the vessel through the first inlet;
(d) passing said aqueous medium into the vessel through the second inlet, such that said hot gas stream and said aqueous medium come into contact with one another inside the vessel to form said sulfur-containing liquid fraction; and
(e) draining said sulfur-containing liquid fraction from the vessel through the outlet;
wherein the aqueous medium contains particles having a particle size distribution (P80) from about 10-150 microns.

* * * * *